(12) United States Patent
Graham et al.

(10) Patent No.: US 9,021,781 B2
(45) Date of Patent: May 5, 2015

(54) FUEL INJECTOR HAVING AN IGNITOR FOR IGNITING A COMBUSTOR OF A GAS TURBINE

(71) Applicant: General Electric Company, Schenectady, NY (US)

(72) Inventors: Kaitlin Marie Graham, Greenville, SC (US); James Scott Flanagan, Simpsonville, SC (US); Jeffrey Scott LeBegue, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 13/734,165

(22) Filed: Jan. 4, 2013

(65) Prior Publication Data

US 2014/0338342 A1 Nov. 20, 2014

(51) Int. Cl.
| | |
|---|---|
| *F02C 7/264* | (2006.01) |
| *F02G 1/055* | (2006.01) |
| *F02G 3/00* | (2006.01) |
| *F23R 3/28* | (2006.01) |
| *F02C 7/22* | (2006.01) |
| *F23R 3/34* | (2006.01) |

(52) U.S. Cl.
CPC ... *F23R 3/28* (2013.01); *F02C 7/22* (2013.01); *F23R 3/34* (2013.01); *F23D 2207/00* (2013.01)

(58) Field of Classification Search
CPC .............. F23R 3/286; F23R 3/32; F23R 3/34; F23R 3/30; F23R 3/28; F23R 3/283; F23R 3/20; F23R 3/50; F02C 7/264; F02C 7/266; F02C 7/22; F02C 7/222; F02K 9/95
USPC .............................. 60/39.821, 776, 737–748
See application file for complete search history.

(56) References Cited

U.S. PATENT DOCUMENTS

| | | | |
|---|---|---|---|
| 2,604,510 A * | 7/1952 | Berkey | 313/126 |
| 5,497,744 A | 3/1996 | Nagaosa et al. | |
| 5,628,180 A * | 5/1997 | DeFreitas | 60/776 |
| 6,748,918 B2 | 6/2004 | Rieger et al. | |
| 6,832,588 B2 | 12/2004 | Herden et al. | |
| 7,077,100 B2 | 7/2006 | Vogel et al. | |
| 8,713,908 B2 * | 5/2014 | Harding | 60/39.821 |
| 2012/0117976 A1 * | 5/2012 | Krull et al. | 60/776 |

* cited by examiner

*Primary Examiner* — Craig Kim
(74) *Attorney, Agent, or Firm* — Dority & Manning, PA

(57) ABSTRACT

A fuel injector for a combustor of a gas turbine includes an annular main body. A fluid circuit extends at least partially through the main body. An axially extending inner body extends within the main body. The inner body at least partially defines an inner chamber that extends at least partially through the inner body. The inner chamber is in fluid communication with the fluid circuit. A retractable igniter extends linearly outward from the inner chamber when the fluid circuit is charged.

20 Claims, 5 Drawing Sheets

FUEL INJECTOR HAVING AN IGNITOR FOR IGNITING A COMBUSTOR OF A GAS TURBINE

FIELD OF THE INVENTION

The present invention generally relates to a gas turbine. More particularly, this invention relates to a fuel injector for igniting a combustor of a gas turbine.

BACKGROUND OF THE INVENTION

Turbine systems are widely utilized in fields such as power generation. A typical gas turbine includes a compressor section, a combustion section downstream from the compressor section and a turbine section downstream from the combustion section. At least one shaft extends at least partially axially through the gas turbine. A generator/motor is coupled to the shaft at one end. The compressor section includes an inlet defined at an upstream end of the compressor section. The combustion section generally includes a casing and a plurality of combustors arranged in an annular array around the casing.

Each combustor includes an end cover that is connected to the casing. At least one fuel nozzle extends generally axially downstream from the end cover and at least partially through a cap assembly that extends radially within the combustor downstream from the end cover. An annular liner such as a combustion liner and/or a transition piece extends downstream from the cap assembly to at least partially define a combustion chamber and/or a hot gas path through the combustor. The liner generally terminates at a point adjacent to an inlet of the turbine section. In certain gas turbine designs, a series of cross fire tubes extend through the liner and the casing between each or some of the plurality of combustors to define a flow path between each adjacent combustor. A spark plug is disposed at or adjacent to the combustion chamber of one of the plurality of combustors.

During start-up or light off of the combustion section, the generator/motor turns the shaft to drive the compressor section. A working fluid such as air is ingested through the inlet of the compressor section and is progressively compressed as it flows through the compressor section towards the combustion section. The compressed air is routed into the combustion section casing where it is distributed to the individual combustors of the combustion section. The compressed air is mixed with a fuel to form a combustible mixture within the combustion chamber of each combustor. The spark plug is triggered to ignite the combustible mixture within the respective combustor. A flame then travels through the cross fire tubes to light off the adjacent combustors in series until each combustor of the combustion section is lit.

The spark plug and the cross fire tubes as a system are generally effective for lighting off the combustion section of the gas turbine. However, various issues with cross fire tube ignition systems, particularly in combustors utilizing late lean technology, may increase cost and may place undesirable restrictions on combustion designers. For example, such issues may include varying thermal growth rates of the adjacent combustors which may lead to leakage around the cross fire tubes, the potential for cross-flow through the cross fire tubes of adjacent combustors after light off, purging of the cross fire tubes after a blow out of one or more of the combustors, re-lighting a combustor after a blow-out event and/or cooling of the cross fire tubes during operation of the gas turbine. In addition, various current spark plug designs may be breach loaded through the casing and/or through the end cover, thereby creating an additional potential leakage area. Accordingly, an improved system for lighting off the combustors of the gas turbine would be useful in the art.

BRIEF DESCRIPTION OF THE INVENTION

Aspects and advantages of the invention are set forth below in the following description, or may be obvious from the description, or may be learned through practice of the invention.

One embodiment of the present invention is a fuel injector for a combustor of a gas turbine. The fuel injector includes an annular main body. A fluid circuit extends at least partially through the main body. An axially extending inner body extends within the main body. The inner body at least partially defines an inner chamber that extends at least partially through the inner body. The inner chamber is in fluid communication with the fluid circuit. A retractable igniter extends linearly outward from the inner chamber when the fluid circuit is charged.

Another embodiment of the present invention is a combustor for a gas turbine. The combustor generally includes an end cover coupled to a casing. A fuel nozzle extends downstream from the end cover. A cap assembly at least partially surrounds a portion of the fuel nozzle. An annular liner extends downstream from the cap assembly. A fuel injector extends generally radially through the liner. The fuel injector includes an annular main body that at least partially defines a flow path through the fuel injector. The annular main body includes a downstream end. A fluid circuit extends at least partially through the main body. An inner body is disposed within the flow path of the main body. The inner body has an opening at a downstream end of the inner body. An inner chamber in fluid communication with the fluid circuit is at least partially defined within the inner body. A retractable igniter is disposed within the inner chamber. The igniter extends linearly through the opening of the inner body and at least partially into the flow path of the main body when the fluid circuit is charged.

Another embodiment of the present invention includes a gas turbine. The gas turbine generally includes a compressor section, a combustion section downstream from the compressor section and a turbine section downstream from the combustion section. The combustion section includes at least one combustor, the combustor having at least one annular liner that at least partially defines a hot gas path through the combustor. A fuel injector extends at least partially through the liner of the combustor. The fuel injector includes an annular main body that at least partially defines a flow path through the fuel injector. A fluid circuit extends at least partially through the main body. An inner chamber in fluid communication with the fluid circuit extends at least partially through the main body. A retractable igniter actuates linearly outward from the inner chamber into the flow path of the main body towards the hot gas path when the fluid circuit is charged.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
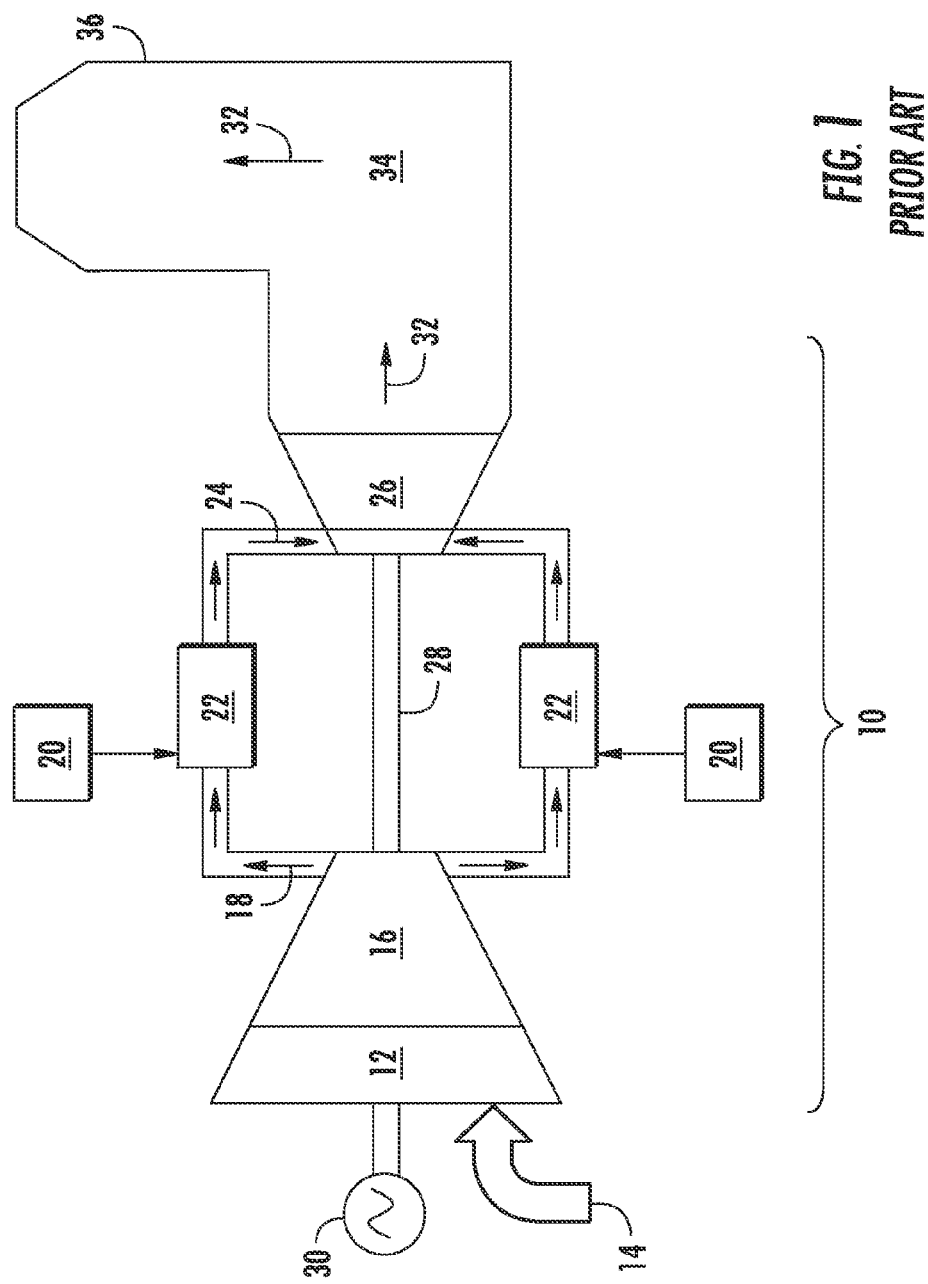
FIG. 1 provides a functional block diagram of an exemplary gas turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a fuel injector incorporated into an industrial gas turbine, one of ordinary skill in the art will readily appreciate from the teachings herein that embodiments of the present invention are not limited to an industrial gas turbine unless specifically recited in the claims.

Referring now to the drawings, wherein identical numerals indicate the same elements throughout the figures. FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel from a fuel supply system 20 to form a combustible mixture within one or more combustors 22. The combustible mixture is burned to produce combustion gases 24 having a high temperature and pressure. The combustion gases 24 flow through a turbine 26 of a turbine section to produce work. For example, the turbine 26 may be connected to a shaft 28 that drives the compressor 16 to produce the compressed working fluid 18, thereby perpetuating the combustion process. Alternately or in addition, the shaft 28 may connect the turbine 26 to a generator 30 for producing electricity. Exhaust gases 32 from the turbine 26 flow through an exhaust section 34 that connects the turbine 26 to an exhaust stack 36 downstream from the turbine 26.

Figure 2:
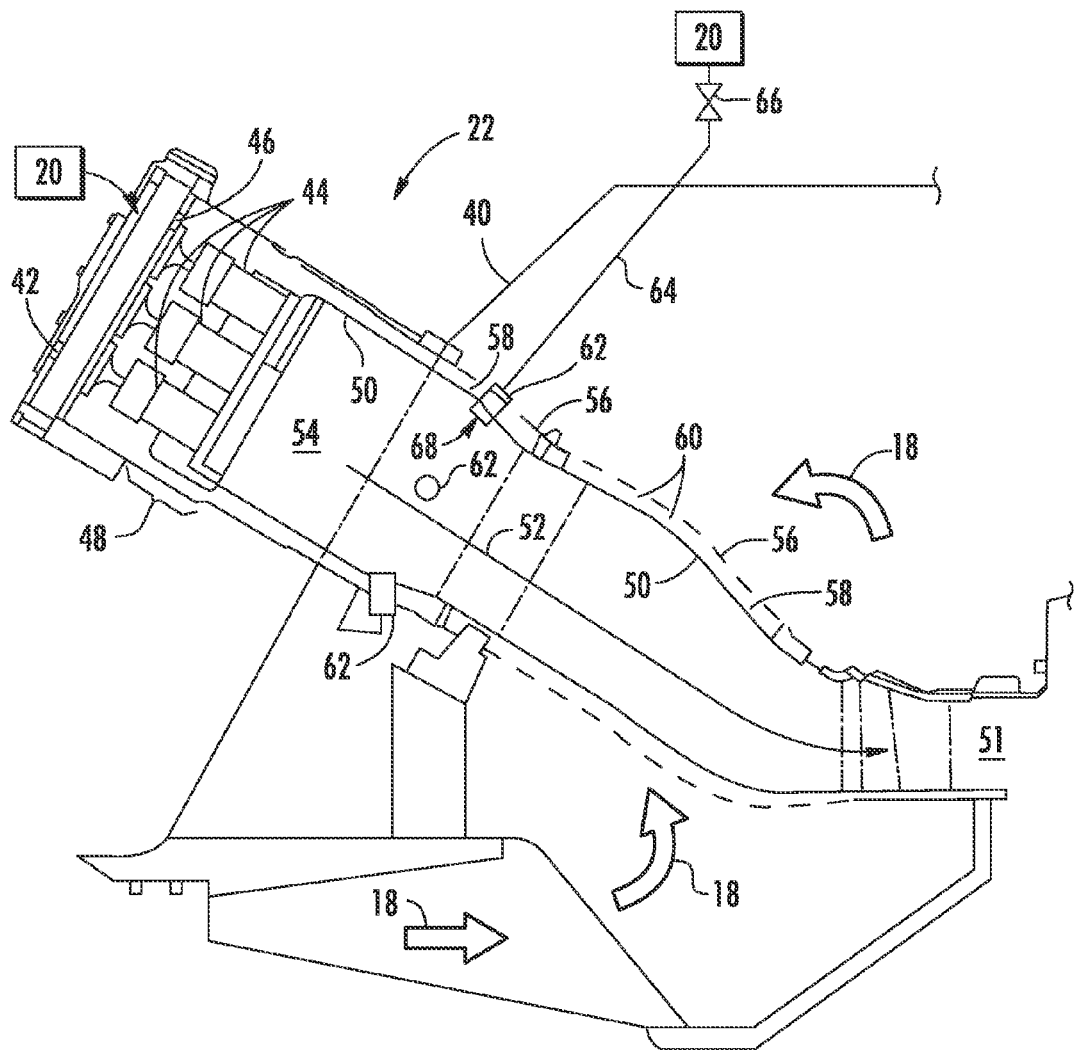
FIG. 2 provides a simplified cross-section side view of an exemplary combustor that incorporates various embodiments of the present invention.

The combustors 22 may include any type of combustor known in the art, and the present invention is not limited to any particular combustor design unless specifically recited in the claims. FIG. 2 provides a simplified cross-section side view of an exemplary combustor 22 that incorporates various embodiments of the present invention. As shown in FIG. 2, a casing 40 and an end cover 42 may combine to contain the compressed working fluid 18 flowing to the combustor 22 from the compressor 16 (FIG. 1). The end cover 42 may be in fluid communication with the fuel supply 20.

At least one primary fuel nozzle 44 extends generally axially downstream from an inner surface 46 of the end cover 42. A radially extending cap assembly 48 at least partially surrounds at least a portion of the primary fuel nozzles 44. An annular liner 50 extends downstream from the cap assembly 48 towards an inlet 51 of the turbine 26 (FIG. 1). The liner 50 at least partially defines a hot gas path 52 that extends through the combustor 22 and into the turbine 26 (FIG. 1). The liner 50 may be a singular component such as a transition nozzle or may include multiple components linked together. For example, the liner 50 may include a combustion liner linked to a transition duct and/or a transition nozzle.

A combustion zone 54 is defined within the liner 50 downstream from the cap assembly 48 and/or the primary fuel nozzles 44. In particular combustor configurations, at least one annular sleeve 56 such as a flow sleeve or an impingement sleeve at least partially surrounds the liner 50 to at least partially define a cooling flow path 58 therebetween. A plurality of cooling holes 60 may extend through the sleeve 56 to route the compressed working fluid 18 into the cooling flow path 58 and towards the end cover 42 to provide cooling to the liner 50.

In particular embodiments, as shown in FIG. 2, a secondary fuel nozzle or fuel injector 62 extends at least partially through the liner 50 and/or at least partially through the annular sleeve 56. The fuel injector 62 may extend through the liner 50 and/or the annular sleeve 56 at any location downstream from the cap assembly 48. For example, the fuel injector may extend through the liner 50 at a point that is generally proximate to the combustion zone 54. The fuel injector 62 is in fluid communication with the fuel supply 20 or with an alternative fuel supply (not shown) through one or more fluid couplings 64 such fluid conduits and/or valves. In particular embodiments, a flow control valve 66 is fluidly connected to the one or more fluid couplings 64 to control a flow rate of fuel to the fuel injector 62 during operation of the combustor 22. In particular embodiments, the combustor 22 may include a plurality of the fuel injectors 62 extending generally radially through the liner 50 and/or the annular sleeve 56 generally downstream from the cap assembly 48.

Figure 3:
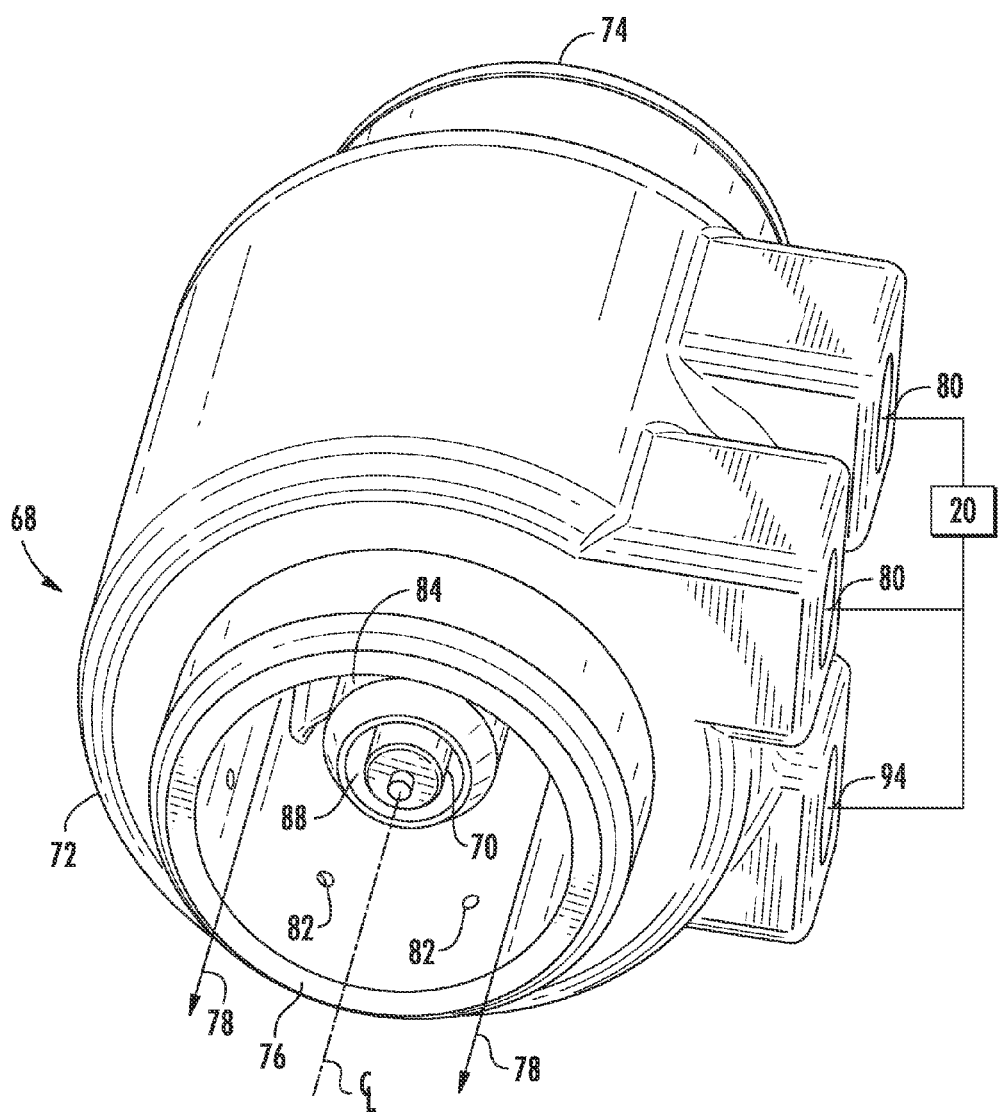
FIG. 3 provides an upstream plan view of a fuel injector according to at least one embodiment of the present invention.
Figure 4:
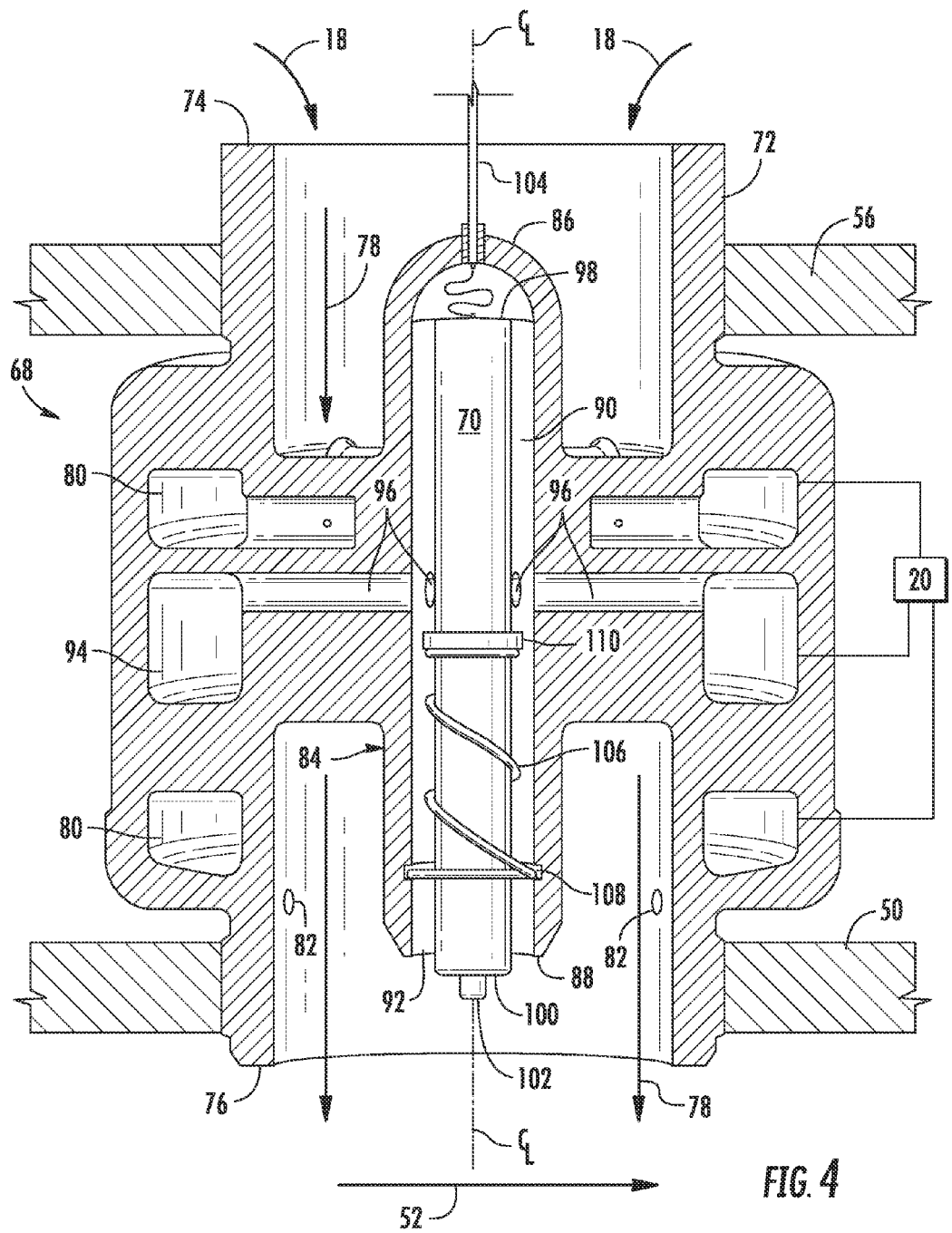
FIG. 4 provides a side cross-section view of the fuel injector as shown in FIG. 3.

In various embodiments, as shown in FIG. 2, the combustor includes a secondary fuel nozzle or fuel injector 68 that includes a retractable igniter. FIG. 3 illustrates a perspective view of the fuel injector 68 as shown in FIG. 2, having a retractable igniter 70, according to at least one embodiment of the present invention, and FIG. 4 provides a cross section side view of the fuel injector 68 shown in FIG. 3, extending at least partially through a portion of the liner 50 according to various embodiments of the present invention. As shown in FIGS. 3 and 4, the fuel injector 68 generally includes an annular main body 72 having an upstream end 74 axially separated with respect to an axial centerline of the main body 72 from a downstream end 76. The main body 72 at least partially defines a flow path 78 that extends through the fuel injector 68. The main body 72 further includes at least one fuel circuit 80 that extends at least partially through the main body 72. The fuel circuit 80 is in fluid communication with the fuel supply 20 or an alternate fuel source (not shown). A plurality of fuel injection ports 82 provide for fluid communication between the fuel circuit 80 and the flow path 78 extending though the main body 72.

As shown in FIGS. 3 and 4, an axially extending inner body 84 extends at least partially through the flow path 78 of the main body 72. The inner body 84 and the main body 72 may be cast and/or machined as a single component or manufactured as separate components. The flow path 78 may be at least partially defined between the inner body 84 and the main body 72. As shown in FIG. 4, the inner body 82 generally includes an upstream end 86 and a downstream end 88. In particular embodiments, the upstream end 86 of the inner body 84 is generally dome shaped.

As shown in FIG. 4, the inner body 84 at least partially defines an inner chamber 90. The inner chamber 90 extends generally axially within the inner body 84. An opening 92 at the downstream end 88 of the inner body 84 provides for fluid communication between the inner chamber 90 and the flow path 78 of the main body 72 of the fuel injector 68 and/or the hot gas path 52 of the combustor 22 (FIG. 2). In certain configurations, a plurality of swirler vanes may extend between the main body 72 and the inner body 84 within the flow path 78 of the main body 72.

A fluid circuit 94 in fluid communication with the fuel supply 20 or with an alternate fuel or air supply (not shown) extends at least partially through the main body 72. At least one inlet port 96 provides for fluid communication between the fluid circuit 94 and the inner chamber 90. The fuel supply 20 may be configured to supply at least one of a liquid fuel, a gaseous fuel and/or a compressed working fluid such as compress air to the fluid circuit 94. The fluid circuit 94 may be in fluid communication with the fuel circuit 80 of the main body 72 or may be a separate circuit.

As shown in FIGS. 3 and 4, the retractable igniter 70 is at least partially disposed within the inner chamber 90. The igniter 70 may be any type of igniter suitable for use within the operating environment of the combustor 22. For example, the igniter 70 may be an electric spark igniter. As shown in FIG. 4, the igniter 70 generally includes a top portion 98, a bottom portion 100 and an ignition tip 102 that extends linearly from the bottom portion 100. The igniter 70 may have any cross sectional shape. For example, the igniter 70 may be cylindrical, triangular, rectangular or any combination thereof. The igniter 70 may be coupled to an electric current source (not shown) through a wire 104 that extends through the inner body 84. In particular embodiments, the wire 104 extends through the upstream end 86 of the inner body 84 and connects to the top portion 98 of the igniter 70. The wire 104 may be coiled within the inner chamber 90 to allow linear movement of the igniter 70 when the fluid circuit 94 is charged.

In particular embodiments, a spring 106 is disposed within the inner chamber 90 of the inner body 84. The spring 106 may be any type of spring suitable for carrying out the present invention. For example, the spring 106 may be a helical compression spring, a tension spring, a spring washer or a wave spring. The spring 106 at least partially surrounds a portion of the igniter 70 within the inner chamber 90. In particular embodiments, the spring 106 is coupled to the igniter 70 to hold the igniter 70 in position and/or to provide a retraction force to the igniter 70.

The inner body 84 may be configured to restrain at least one end of the spring 106. For example, a retention feature 108 such as a slot or landing may be at least partially defined within the inner body 84 to hold the spring 106 in position within the inner chamber 90. The retention feature 108 may be positioned towards the upstream end 86 or the downstream end 88 of the inner body 84. In particular embodiments, a radially extending pressure plate 110 at least partially circumferentially surrounds the igniter 70 within the inner chamber 90. The pressure plate 110 may be attached to the igniter 70 and/or to the spring 106.

As shown in FIG. 4, the igniter 70, in particular the bottom portion of the igniter is substantially surrounded by the inner body 84 when the fluid circuit 94 is passive or uncharged. In this manner, the igniter 70, particularly the bottom portion 100 and/or the ignition tip 102, are at least partially shielded from the hot gases flowing through the hot gas path 52 of the combustor 22. As a result, thermal stresses on the igniter 70 may be mitigated during operation of the combustor 22, thereby increasing the mechanical life of the igniter 70.

Figure 5:
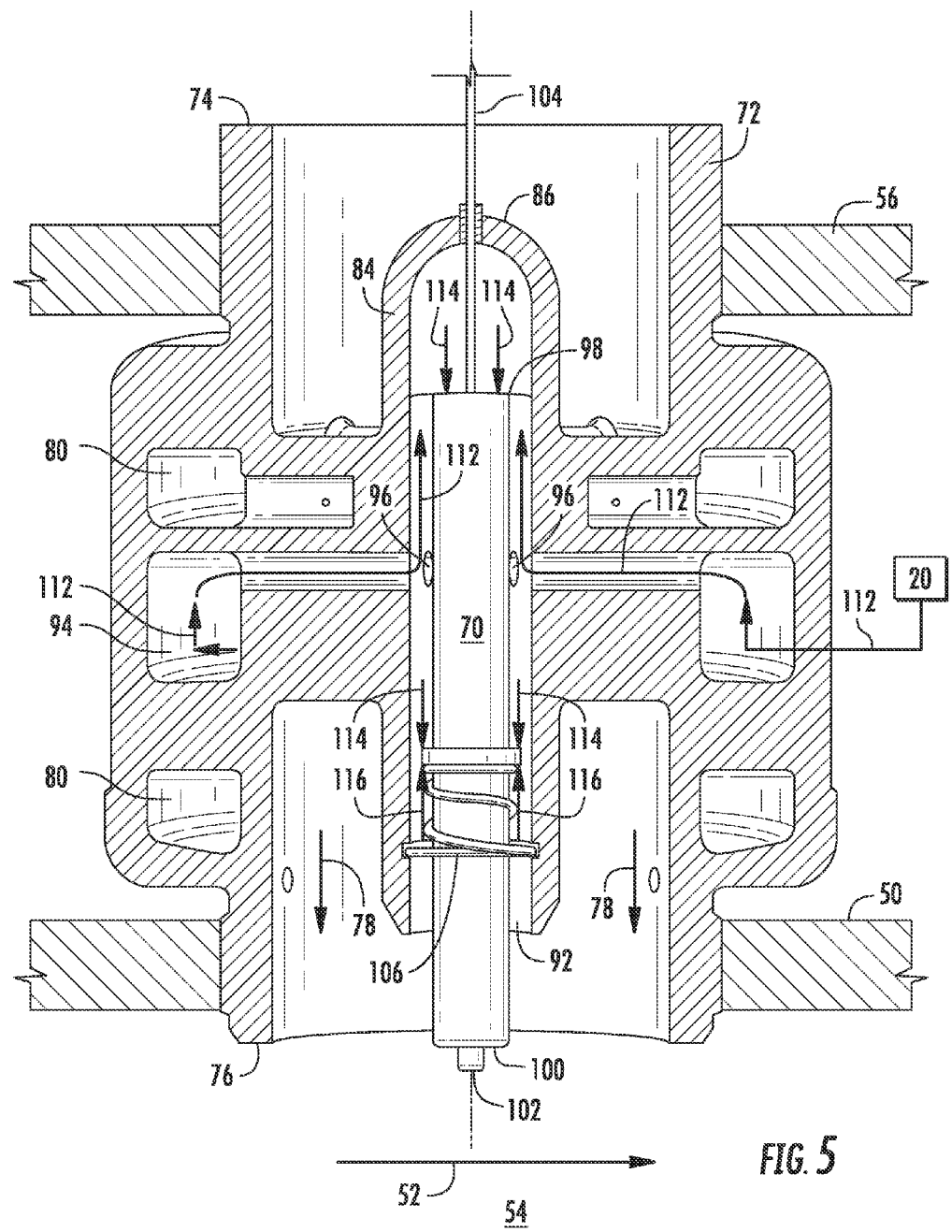
FIG. 5 provides a side cross-section view of the fuel injector as shown in FIG. 4, according to at least one embodiments of the present invention.

FIG. 5 provides a cross section side view of the fuel injector 68 shown in FIG. 4 with the fluid circuit 94 charged such as during ignition or light off of the combustor. In one embodiment, fuel 112 is routed from the fuel supply 20 into the fluid circuit 94. The fuel 112 flows through the inlet ports 96 and into the inner chamber 90. The fuel travels between the igniter 70 and the inner chamber 90 towards the upstream end 86 of the inner body 84 and towards the top portion of the igniter 70.

The fuel pressurizes the inner chamber, thereby exerting an axial force on the top portion 98 of the igniter 70 and/or on the pressure plate 110. The axial force overcomes an opposite axial force exerted by the spring 106, thereby causing a portion of the igniter 70 including the bottom portion 100 and/or the ignition tip 102 to extend linearly through the opening 92 of the inner body 84. In particular embodiments, the bottom portion 100 and/or the ignition tip 102 extends into the flow path 78 at least partially defined between the main body 72 and the inner body 84 of the fuel injector 68. In further embodiments, the bottom portion 100 and/or the ignition tip 102 extends into the hot gas path 52 and/or into the combustion zone 54 (FIG. 2) of the combustor 22.

Fuel is supplied to the combustion zone 54 (FIG. 2) through one or more of the primary fuel nozzles 44 (FIG. 2) and/or through the one or more fuel injection ports 82 of the fuel injector 68. The igniter 70 is triggered through the wire 104 causing a high voltage spark to extend from the ignition tip 102, thereby igniting the fuel in the combustion zone 54 and/or within the flow path 78. Once the combustor 22 (FIG. 2) is lit, the fuel supply 20 supplying the fuel to the fluid circuit 94 may be shut off. As a result, the pressure within the inner chamber is reduced or eliminated and the spring force 116 causes the igniter 70 to retract back to its original position as shown in FIG. 4. In alternate embodiments, the flow rate of the fuel may be increased or decreased to adjust the position of the igniter tip 102.

In alternate embodiments, the fluid circuit 94 may remain charged after ignition of the combustor 22. In this manner, the fuel 112 flowing from the inner chamber through the opening of the inner body may provide beneficial cooling to the bottom portion and/or the ignition tip of the igniter. In addition or in the alternative, the compressed working fluid 18 may be routed through the flow path 78 of the main body or a compressed working fluid such as air may be routed through the fuel supply 20 to the fluid circuit to provide cooling to the bottom portion 100 and/or the ignition tip 102 of the igniter.

The invention as illustrated in FIGS. 2 through 5 and as described herein, provides various technical advantages over existing fuel injectors and ignition systems currently utilized for combustors of gas turbines. For example, the fuel injector 68 having the retractable igniter 70 may be mounted in an existing secondary fuel nozzle or fuel injector 62 opening within the liner of the combustor such as in a late lean fuel injection system, thereby eliminating the need for a breach loaded igniter as currently utilized in many gas turbine combustor designs. In addition, the compact/integrated design of the fuel injector 68 allows for installation within each combustor of the combustion section, thereby eliminating the need for cross fire tubes between adjacent combustors. As a result, the potential of continuous cross flow between cross fire tubes and the combustor flow/mixing issues associated with purging/cooling of the cross fire tubes may be improved and/or eliminated. In addition, the fuel injector 68 allows the cans of the combustion to light off independently in case of a blow-out event in a single combustor, thereby improving recovery time from such an event. Additionally, the fuel injector 68 reduces the number of leak points through the combustion casing by eliminating the breach loaded spark igniter found in certain combustion designs. In addition, the concern of combustor to combustor thermal expansion is minimized, especially for transition duct and/or transition nozzle configurations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A fuel injector for a combustor of a gas turbine, comprising:
   a. an annular main body;
   b. a fluid circuit that extends at least partially through the main body;
   c. an axially extending inner body that extends within the main body;
   d. an inner chamber at least partially defined within the inner body, the inner chamber being in fluid communication with the fluid circuit; and
   e. a retractable igniter that extends linearly outward from the inner chamber when the fluid circuit is pressurized with a fuel.

2. The fuel injector as in claim 1, further comprising a spring disposed within the inner chamber, the spring being coupled to the igniter.

3. The fuel injector as in claim 1, further comprising a radially extending pressure plate disposed within the inner chamber, the pressure plate at least partially circumferentially surrounding the igniter.

4. The fuel injector as in claim 1, wherein the fluid circuit is in fluid communication with at least one of a liquid fuel source, a gaseous fuel source or a compressed working fluid source.

5. The fuel injector as in claim 1, wherein the upstream end of the inner body is dome shaped.

6. The fuel injector as in claim 1, further comprising an annular flow path at least partially defined between the main body and the inner body.

7. The fuel injector as in claim 6, further comprising a fuel circuit and a fuel injection port, the fuel injection port at least partially defining a flow path between the fuel circuit and the annular flow path of the fuel injector.

8. The fuel injector as in claim 1, wherein the main body includes an upstream end axially separated from a downstream end, the igniter extending downstream from the downstream end of the main body when the fluid circuit is pressurized with the fuel.

9. A combustor for a gas turbine, comprising:
   a. an end cover coupled to a casing, a fuel nozzle that extends downstream from the end cover, a cap assembly that at least partially surrounds a portion of the fuel nozzle, and an annular liner that extends downstream from the cap assembly; and
   b. a fuel injector that extends radially through the liner, the fuel injector comprising:
      i. an annular main body that at least partially defines a flow path through the fuel injector, the main body having a downstream end;
      ii. a fluid circuit that extends at least partially through the main body;
      iii. an inner body disposed within the flow path of the main body, the inner body having an opening at a downstream end of the inner body;
      iv. an inner chamber at least partially defined within the inner body, the inner chamber being in fluid communication with the fluid circuit; and
      v. a retractable igniter disposed within the inner chamber, the igniter extending linearly through the opening of the inner body and at least partially into the flow path of the main body when the fluid circuit is pressurized with the fuel.

10. The combustor as in claim 9, wherein the liner is one of a combustion liner, a transition duct or a transition nozzle.

11. The combustor as in claim 9, wherein the fuel injector further comprises a spring disposed within the inner chamber, the spring being connected to the igniter.

12. The combustor as in claim 9, wherein the fuel injector further comprises a pressure plate disposed within the inner chamber, the pressure plate at least partially circumferentially surrounding the igniter.

13. The combustor as in claim 9, wherein the fluid circuit of the fuel injector is in fluid communication with at least one of a liquid fuel source, a gaseous fuel source or a compressed working fluid source.

14. The combustor as in claim 9, wherein the inner chamber of the fuel injector comprises a dome shaped upstream end.

15. The combustor as in claim 9, wherein the fuel injector further comprises a fuel circuit and at least one fuel injection port, the fuel injection port defining a flow path between the fuel circuit and the flow path of the fuel injector.

16. The combustor as in claim 9, wherein the retractable igniter of the fuel injector extends downstream from the downstream end of the main body when the fluid circuit is pressurized with the fuel.

17. A gas turbine comprising:
   a. a compressor section;
   b. a combustion section downstream from the compressor section, the combustion section having a combustor, the combustor having at least one annular liner that at least partially defines a hot gas path through the combustor;

c. a turbine section downstream from the combustion section; and
d. a fuel injector that extends at least partially through the liner of the combustor, the fuel injector comprising:
   i. an annular main body that at least partially defines a flow path through the fuel injector;
   ii. a fluid circuit that extends at least partially through the main body;
   iii. an inner chamber that extends at least partially through the main body, the inner chamber being in fluid communication with the fluid circuit; and
   iv. a retractable igniter that actuates linearly outward from the inner chamber into the flow path of the main body towards the hot gas path when the fluid circuit is pressurized with a fuel.

18. The gas turbine as in claim 17, wherein the fuel injector further comprises a spring disposed within the inner chamber of the fuel injector.

19. The gas turbine as in claim 17, wherein the fluid circuit is in fluid communication with at least one of a liquid fuel source, a gaseous fuel source or a compressed working fluid source.

20. The gas turbine as in claim 17, wherein the fuel injector further comprises a fuel circuit and at least one fuel injection port, the fuel injection port defining a flow path between the fuel circuit and the flow path of the fuel injector.

\* \* \* \* \*